United States Patent [19]

Burror et al.

[11] Patent Number: 4,851,985

[45] Date of Patent: Jul. 25, 1989

[54] FAULT DIAGNOSIS SYSTEM FOR COMPARING COUNTS OF COMMANDED OPERATING STATE CHANGES TO COUNTS OF ACTUAL RESULTANT CHANGES

[75] Inventors: David N. Burror, Troy; Daniel J. Opalewski, Sterling Heights; James S. Seymour, Clawson, all of Mich.

[73] Assignee: Logitek, Inc., Madison Heights, Mich.

[21] Appl. No.: 723,409

[22] Filed: Apr. 15, 1985

[51] Int. Cl.⁴ .............................................. G05B 23/02
[52] U.S. Cl. ............................. 364/184; 364/474.19; 371/25
[58] Field of Search .............. 364/184, 167, 551, 200, 364/185, 186, 468, 472, 474, 475, 168, 474.19; 371/25, 68

[56] References Cited

U.S. PATENT DOCUMENTS

| | | | |
|---|---|---|---|
| 3,829,842 | 8/1974 | Langdon et al. | 364/900 |
| 3,939,453 | 2/1976 | Schroeder | 364/900 |
| 4,063,311 | 12/1977 | Jeremiah et al. | 364/900 |
| 4,370,705 | 1/1983 | Imazeki et al. | 364/184 |
| 4,437,153 | 3/1984 | Kamiyama et al. | 364/184 |
| 4,456,960 | 6/1984 | Wakai | 364/164 X |
| 4,459,695 | 7/1984 | Barratt et al. | 371/25 |
| 4,519,025 | 5/1985 | Fayette | 364/184 X |
| 4,574,343 | 3/1986 | Inatomi | 364/184 |
| 4,608,628 | 8/1986 | Saito et al. | 364/141 |
| 4,633,384 | 12/1986 | Kusumi | 364/184 |

Primary Examiner—Clark A. Jablon
Attorney, Agent, or Firm—Dykema Gossett

[57] ABSTRACT

A device implemented method diagnoses faults in a machine system or the like having a plurality of multistate operating elements which are controlled by commands issued by a programmable controller. The method involves sensing the issuance of each command, sensing each change in state of an operating element and then periodically correlating the sensed commands with the sensed changes in operating states; the failure to correlate a sensed command with a sensed change in state is used to indicate the existence of an operating fault. The method is implemented by a microcomputer system which receives data in the form of commands and state changes from the programmable controller, and performs the correlation by comparing the sensed data with a memory-stored diagnostic table of commands and respectively associated state changes in order to determine whether a command has been issued that did not result in a change of state and whether a change in state has occurred without a corresponding command having been issued. The microcomputer system includes a diagnostic keyboard/display terminal to permit editing of the diagnostic table and generation of various fault reports.

10 Claims, 3 Drawing Sheets

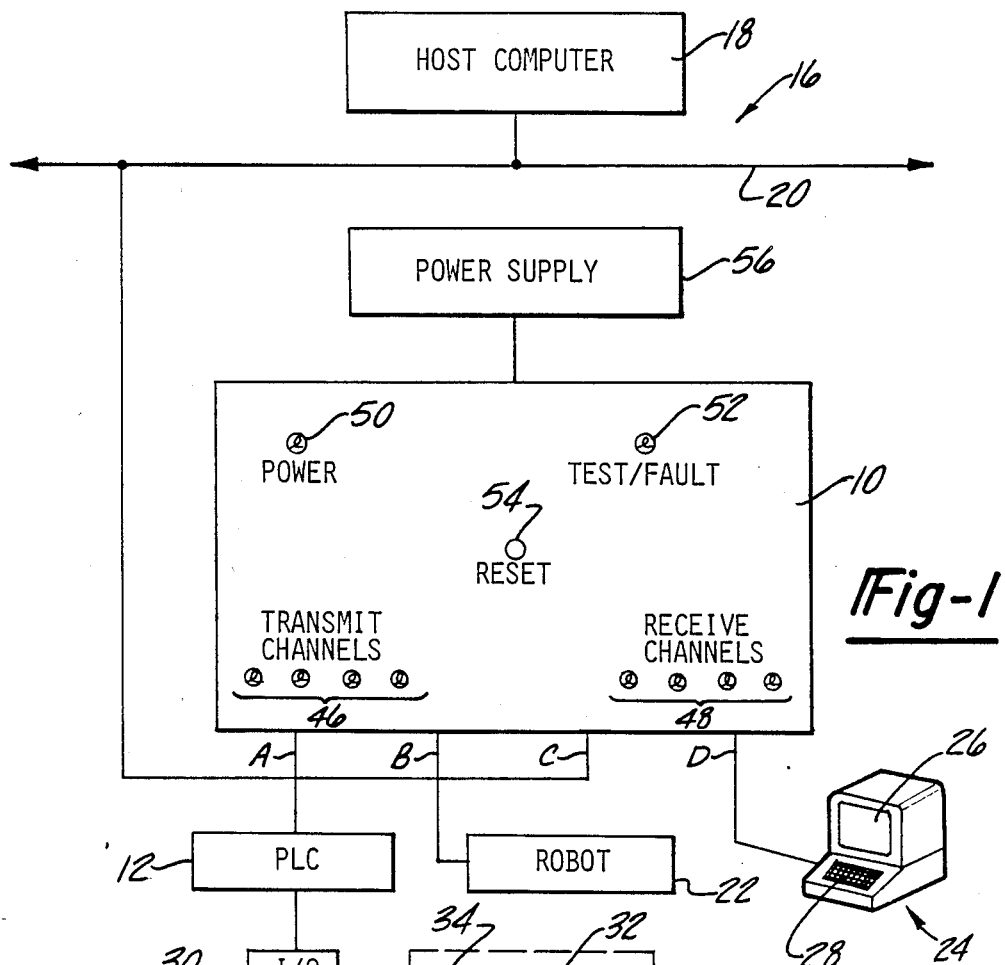
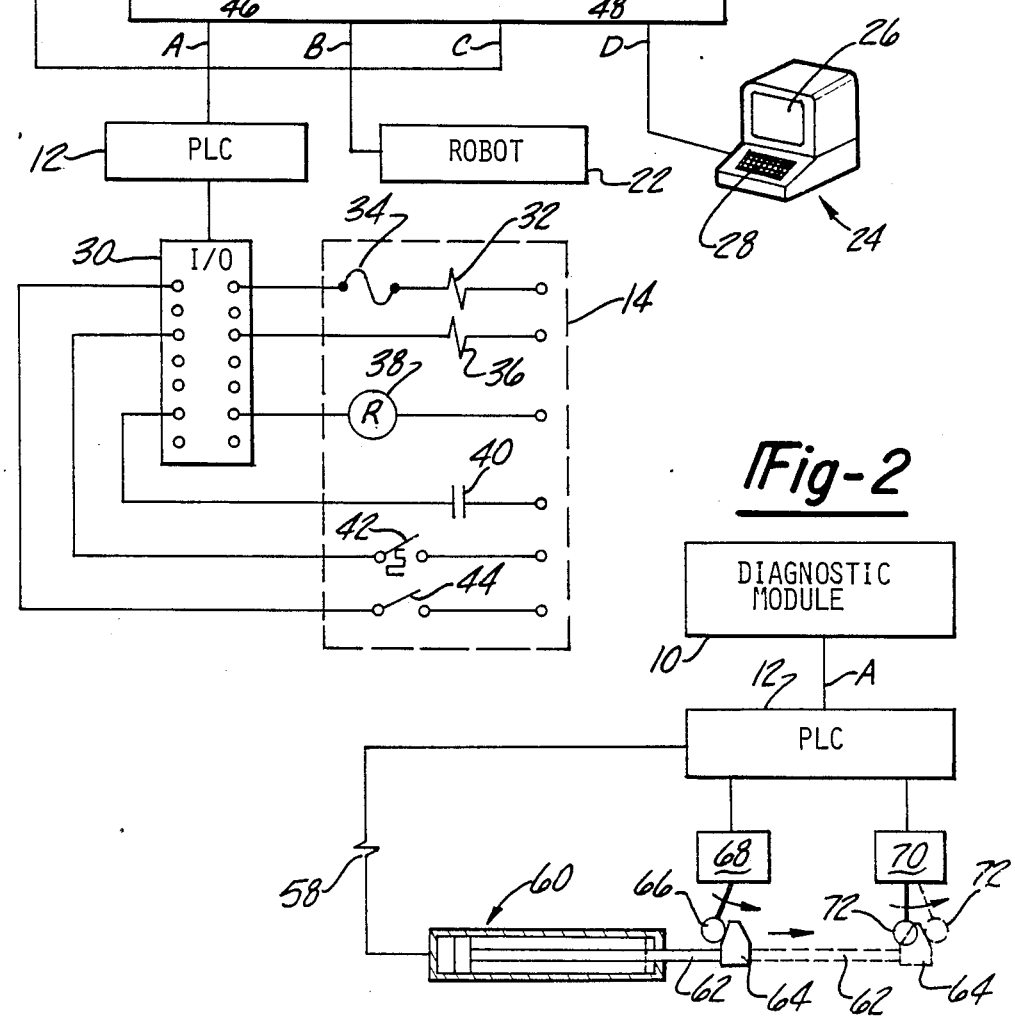

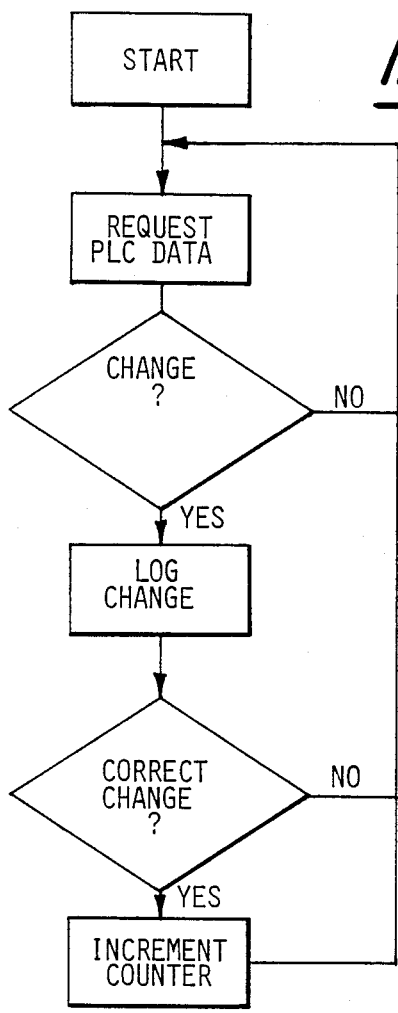
*Fig-3*
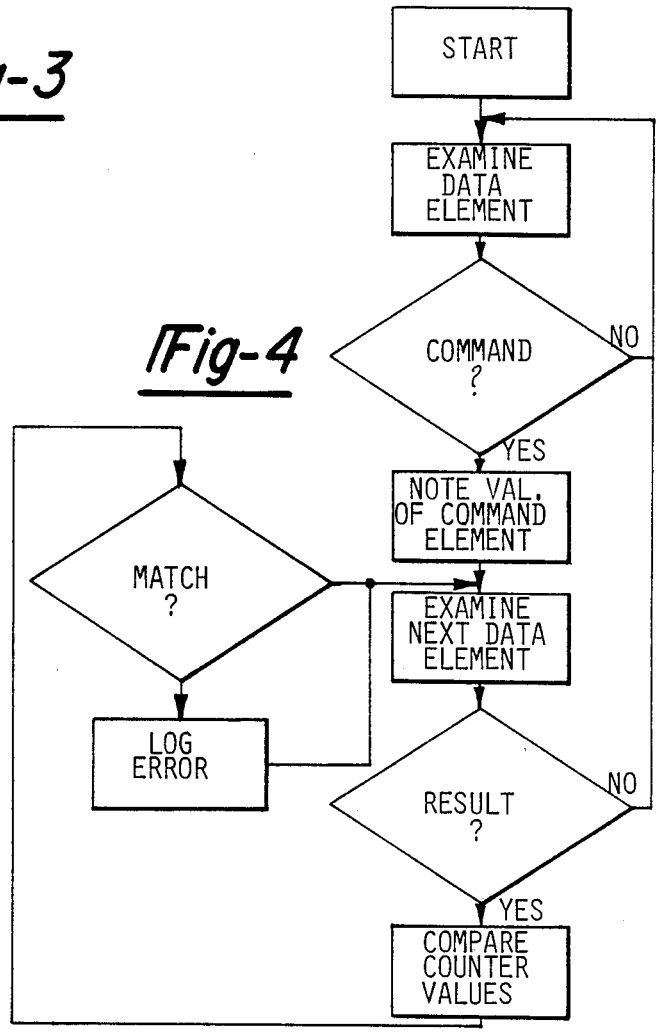
*Fig-4*
| DIAGNOSTIC ENTRY ||||||||
| COMMAND |||| RESULT ||||
| STA | ADDR | STATE | DESCRIPTION | ADDR | STATE | DESCRIPTION |
|---|---|---|---|---|---|---|
| 00 | 00003 | ON | OPEN CLAMPS | 01001<br>01002<br>01003 | OFF<br>OFF<br>OFF | CLAMPS CLOSED-RH<br>CLAMPS CLOSED-LH<br>CLAMPS CLOSED-CTR |
*Fig-5*
| STATION START/STOP DEFINITION ||||||||
| START |||| STOP ||||
| STA | ADDR | STATE | DESCRIPTION | ADDR | STATE | DESCRIPTION |
|---|---|---|---|---|---|---|
| 00<br>01<br>02<br>03<br>04<br>05 | 00010 | ON | STA 0 CYCLE START | 00011 | ON | STA 0 CYCLE END |
*Fig-6*

FAULT DIAGNOSIS SYSTEM FOR COMPARING COUNTS OF COMMANDED OPERATING STATE CHANGES TO COUNTS OF ACTUAL RESULTANT CHANGES

TECHNICAL FIELD

The present invention broadly relates to diagnostic systems, and deals more particularly with a diagnostic system for detecting operating faults in a machine system or the like operated by a programmable controller.

BACKGROUND ART

Complex machines and industrial processes are frequently operated by a control system employing a programmable controller. The process or machine typically includes a plurality of operating elements which may be any of various types such as numeric, mechanical, hydraulic, electronic analog and digital. The controller operates to hold an operating variable to a fixed value or set point in accordance with a programmed set of data normally stored in a memory. The control function may range from a simple on-off type to those employing complex mathematical functions.

The advent of programmable controllers has substantially affected the design of control systems and has introduced a higher level of complexity into the machinery and its associated control logic. As a result of this increased level of complexity, a need has developed for diagnosing faulty equipment. Diagnostic capability is particularly important for large industrial processes and machines where it is necessary to promptly detect and pinpoint equipment faults in order to minimize down-time.

A number diagnostic devices for use with programmable controllers have been devised in the past. One type of diagnostic device commonly referred to as "on-board" or "processor resident", forms an integral part of and is physically resident within the programmable controller. Processor resident diagnostic typically use the CPU (central processing unit) of the controller, require substantial memory and result in an increase in the time required for scanning the inputs and output of the controller. As a result, it is necessary to either sacrifice processing time in the controller or resort to other forms of non-resident diagnostics.

"Off-board" or non-resident diagnostics are also less than completely satisfactory for several reasons. For example, one disadvantage involves the fact that only a limited amount of data may be obtained from the programmable controller through its data port because such controllers do not readily permit access to their hardware bus structure. The restricted rate at which diagnostic data may be obtained through a data port of the controller severely limits diagnostic analysis. For example, "masking" type diagnostic techniques continually fault due to the restricted data rate, since not every current state of an operating element can be detected before the next machine cycle. Moreover, "learning" type diagnostic techniques which depend on a "teach mode" can not be properly utilized in an off-board diagnostic system because each request for data will randomly miss important events and will thus be "taught" invalid reference data.

In any event, both on-board and off-board diagnostic systems proposed in the past have necessitated the use of a mini or main frame computer implementation, thus posing substantial costs in terms of equipment and programming time. Also, prior art diagnostic systems are usually of a dedicated type i.e., these systems are particularly designed to detect faults in a particular machine or process system and cannot be readily adapted for use with other kinds of machines or processes.

Finally, in the case of diagnostic systems which are embedded in the programmable controller it is necessary to change the diagnostic program in order to match each change that is made in the controller logic. Additionally, in the event of a logic failure it is difficult to determine whether such failure has occurred in the controller logic or the diagnostic logic.

SUMMARY OF THE INVENTION

The present invention overcomes each of the deficiencies related to prior art diagnostic systems discussed above. The present diagnostic system is of an off-board type which receives diagnostic data from the data port of the programmable controller without sacrifice in diagnostic capability due to restrictions in the data transmission rate. The system is highly flexible and includes a diagnostic terminal allowing the associated diagnostic program to be readily edited in order to adapt the system for use with different process and/or machine configurations. Moveover, the present system does not require specialized logic in the programmable controller, but rather is readily adapted for use with virtually all types of existing controllers.

According to the present invention, a device implemented method is provided for diagnosing faults in a machine system, process or the like having a plurality of multi-state operating elements which are controlled by commands issued by a programmable controller. The method broadly includes the steps of sensing the issuance of each command by the controller, sensing a change in state of each of the operating elements, correlating the sensed change in state with the sensed commands, declaring a fault if a sensed change in state cannot be correlated with a sensed command, and declaring a fault if a sensed command cannot be correlated with an associated, sensed change in state of the corresponding operating element. The method is performed using a microcomputer system having a plurality of input/output channels, one of which is coupled with the data output port of the programmable controller. The microcomputer receives data from the programmable controller in the form of issued commands and changes in states of the operating elements. The microcomputer includes a memory-stored diagnostic data table which relates each command with each possible operating state for that command. The correlation is performed by comparing the data received from the programmable controller with the memory-stored diagnostic table of commands and corresponding state changes to determine whether a command has been issued that did not result in a corresponding change of state, and whether a change in state has occurred without a corresponding command having been issued. A count is generated of the number of recorded commands and changes of state, and these two counts are then compared to determine whether a disparity therebetween exists which indicates an operating fault. The microcomputer system further includes a diagnostic keyboard-display terminal to permit user-editing of the memory stored diagnostic table and generation of fault reports. Through the use of the diagnostic terminal, the user may readily reconfigure the system to accommodate changes in the controlled process/machine or programming changes in the controller.

BRIEF DESCRIPTION OF THE DRAWINGS

In the drawings, which form an integral part of the specification and are to read in conjunction therewith, and in which like reference numerals are employed to designate identical components in the various views:

FIG. 1 is a combined block and diagrammatic view of a machine/process controlled by a programmable controller and employing the diagnostic system which forms the preferred embodiment of the present invention;

FIG. 2 is a combined block and diagrammatic view similar to FIG. 1, but simplified to illustrate the operating principle of the invention in connection with a simple machine element;

FIG. 3 is a computer program flowchart for the data collection method used in the system of the present invention;

FIG. 4 is a computer program flow chart for the method of fault diagnosis employed in the system of the present invention;

FIG. 5 is a fragmentary view of information typically displayed on the diagnostic terminal CRT during programming/editing of the diagnostic table in connection with the machine elements associated with a single process or work station;

FIG. 6 is a view similar to FIG. 5 but depicting a typical display during programming/editing of the diagnostic table in connection with a plurality of processes or work stations; and, FIG. 7 is a block diagram of a microcomputer forming a part of the system of the present invention.

DETAILED DESCRIPTION OF A PREFERRED EMBODIMENT

Figure 7:
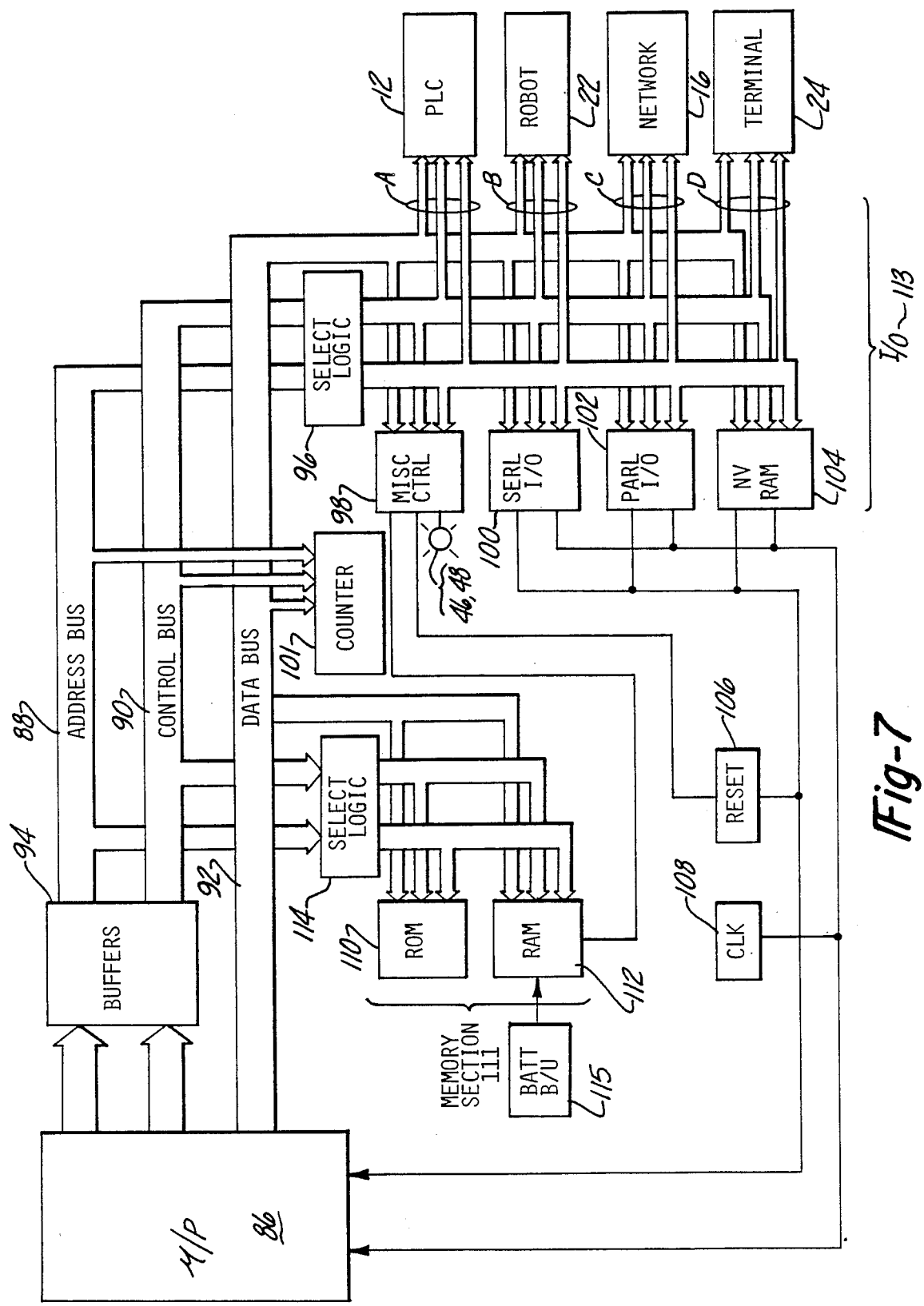

Referring first to FIG. 1, the present invention includes a diagnostic system comprising a diagnostic module 10 and a diagnostic user terminal generally indicated by the numeral 24. The diagnostic module 10 is coupled with a suitable source of power 56 such as a 115 volt or 220 volt AC power supply 56.

The diagnostic module 10 includes a plurality of serial input/output channels respectively designated in FIG. 1 as A, B, C, D, for sending and receiving digital data in serial format. Four LED type indicators 46 on the module 10 respectively corresponding to channels A-D are provided to visually announce the transmission of data on the corresponding channels A-D. For example, the LED indicator 46 on the far left side normally illuminated when channel A is communicatively connected with the PLC 12, but flashes intermittently when data is being transmitted on channel A. In a similar manner, the diagnostic module 10 includes four LED type indicators 48 which visually announce the reception of serial data on the respectively associated channels A-D. LED indicator 50 is illuminated when the module 10 is receiving power from the power supply 56. An LED test/fault indicator 52 illuminates momentarily when the module 10 is first powered up, but flashes rapidly or turns on constantly in the event of a malfunction or fault in the internal hardware of the module 10. Additionally, the indicator 52 illuminates briefly when a reset switch 54 is actuated in order to provide the user assurance that the indicator 52 is operational. Finally, indicator 52 will blink briefly if a communication error on one of the channels A-D occurs.

The reset switch 54, which may be of a conventional push-button, mechanical type is manually actuated by the user in the event that the test/fault indicator 2 remains illuminated, or immediately after the program for the module 10 is edited by the user, as will be hereinafter discussed.

Channel A of the diagnostic module 10 is communicatively coupled with a PLC (programmable logic controller) 12 of the conventional type which includes a set of programmed instructions and an input/output interface board 30 for controlling the operation of one or more machine-like, multi-state operating elements of a process or machine generally indicated within the broken line 14. As will be discussed below, the diagnostic system of the present invention is operable to detect a malfunction or "fault" in the operating elements of the machine 14 or in the electrical circuits which connect the operating elements of the machine 14 with the interface board 30 of the PLC 12.

Channel B of the diagnostic module 10 may optionally be employed for controlling a robot 22 or the like in accordance with a set of programmed instructions stored in a later described memory section of the module 10.

The diagnostic system of the present invention may be employed for fault detection in a large industrial system of the type in which each facet of a number of processes or machine stations is communicatively connected with and controlled by a host computer 18 through a common data bus 20 which forms a network generally indicated at 16. In this type of network application, channel C of the diagnostic module 10 is communicatively connected with network bus 20; consequently the host computer 18 communicates with the PLC 12 through the diagnostic module 10 which is connected in series between the network bus 20 and PLC 12 via channels A and C.

Finally, channel D is employed to communicatively interconnect the module 10 with the diagnostic terminal 24. Terminal 24 may be of a conventional type employing CRT (cathode ray tube) 26 and a suitable keyboard 28 which preferably employs one or more special function keys hereinafter described.

The interface board 30 typically comprises a strip of terminal pairs which are respectively connected in series with circuits associated with each of the operating elements of the process or machine 14. The issuance of a command from the PLC 12 results in either the opening or closure of a corresponding pair of terminals on the board 30, thereby opening or closing the associated circuit to actuate or deactuate the corresponding operating element. As shown in FIG. 1, the operating element may comprise, by way of example, a switch 44 which is actuated by a machine element or the like (not shown), the actuation of switch 44 resulting in operation of a corresponding solenoid 32 which is connected in series with the switch 44 through a fuse 34. A second circuit forming an operating element of the machine 14 comprises a solenoid 36 whose actuation controls a pressure switch 42. Finally, by way of further example, a third circuit forming another operating element of the machine 14 consists of a pair of relay contacts 40 controlled by a relay coil 38. It is to be understood that the machine-like operating elements described above are merely illustrative of numerous mechanisms and electrical circuits which can be controlled and monitored by the PLC 12.

The fundamental operating theory underlying the diagnostic system of the present invention can be simply explained with reference to the illustrative example depicted in FIG. 2, wherein the diagnostic module 10 is connected through channel A to the PLC 12 which is in turn communicatively connected through an appropriate interface (not shown) to a machine. The machine, which is controlled by the PLC 12, includes a piston and cylinder assembly 60 operated by a solenoid 58 and a pair of mechanically actuated, electrical switches 68 and 70. The piston and cylinder assembly 60 includes a reciprocal plunger 62 having an actuator 64 for engaging and displacing shiftable switch members 66 and 72 which respectively operate switches 68 and 70. With the plunger 62 and actuator 64 shown in the full line position, switch 68 is actuated, sending a high signal to the PLC 12, and switch 70 is in a deactuated state, thereby sending a low signal to the PLC 12. It may thus be appreciated that, with the machine in the condition described above, the state or condition of the solenoid 58 (deenergized) has associated therewith the states of switches 68 and 70, i.e. actuated and deactuated states respectively. The PLC 12 senses the operating states of solenoid switches 58, 68 and 70, and makes these operating states available on its output data port (not shown), along with the command "deactuate" which has been transmitted to the solenoid 58 in order to produce this set of operating states. The issued command and the associated operating states are transmitted by channel A to the diagnostic module 10 for monitoring and analysis.

When a second command is issued from PLC 12 to the solenoid 58, the piston and cylinder assembly is actuated, and the plunger 62 and associated actuator 64 shifts to the dotted line position, resulting in the deactuation of switch 68 and the actuation of switch 70. Thus, the second command results in a change of operating states of both switches 68 and 70 as well as the solenoid 58.

Diagnostic module 10 includes a memory stored diagnostic table which correlates each possible command issued by the PLC 12 with corresponding, resultant operating states of solenoid 58 and switches 68, 70. The diagnostic module 10 thus compares the incoming data on channel A with the data in the memory stored diagnostic table in order to correlate the two sets of data. Thus, in effect, a comparison is made to determine whether the sensed operating states of switches 68, solenoid 58 and 70 correspond to the sensed command transmitted issued by the PLC 12 and, conversely, a comparison is made to determine whether the sensed command can be correlated to the memory stored operating states for that command. The correlation technique described above can be performed on a real-time basis, or the sensed commands and operating states may be recorded over a period of time and correlation analysis may be later performed on a demand basis.

From the foregoing, it is apparent that there are two basic premises underlying the method: for each command issued by the PLC 12 there is a corresponding change in state of one or more controlled operating elements, and any change in the operating state of a controlled operating element is the result of the issuance of a corresponding command. In the preceding example, the diagnostic module 10 announces a fault in the event that the sensed command fails to correlate with the sensed operating states. For example, if the solenoid 58 was defective, the issuance of a command for the solenoid 58 to actuate would not result in a corresponding change of state of the switches 68 and 70, and a positive correlation could not then be achieved by the diagnostic module 10. Alternatively, with the solenoid 58 in a deactuated condition as a result of a low command signal from the PLC 12, an open circuit in the switch 68 (which is normally held in an actuated position when the solenoid 58 is deenergized) would result in an operating state which could not be correlated to the corresponding low command signal delivered to the solenoid 58.

Referring again to FIG. 1, the diagnostic module 10 includes a later discussed microcomputer system which is controlled by an operator through the diagnostic terminal 24. The control program of the microcomputer system is organized to present to the operator via the CRT 26 the following menu of operator selectable functions:
1. Station start/stop definition
2. Diagnostic editor
3. Timing editor
4. Fault display
5. Communication menu
6. Run/stop Any of the above listed functions may be selected by the operator through the use of the keyboard 28. After the operator selects a particular function from the menu, special function keys, forming a portion of the keyboard 28, may be employed to control cursor movement, enter commands and edit data in accordance with the associated software.

The "Diagnostic Editor" permits the operator to enter into the memory-stored diagnostic table, data corresponding to sets of commands and the results or operating states corresponding to the command. A typical display on the CRT 26 after selection of the diagnostic editor is shown in FIG. 5. The lines of data entered into the diagnostic table are divided into two broad sections: "commands" and "result". The command section is divided into the following data fields: "station", "address", "state" and "description". Similarly, the results section of the table is divided into an address field, a state field and a description field.

The station field defines the particular machine station to be controlled by the PLC which, in the present example, is a clamping station having three sets of clamps. The address field defines the location in memory where the corresponding data is stored. The "state" field of the command section describes the operating state of the command while the related "description" field defines the function to be performed in that state. Thus, when the command state is "on", the command issued by the PLC 12 is intended to open the clamps. The "state" and "description" fields of the results section of the table define the operating state of the three clamps when the command state is "on". In this particular example the operating states of the results section are each off, but could be any combination of "on's" or "off's" in a different application.

It should be noted here that any number of "results" data associated with various operating elements can be entered for a single "command" entry. In the event that the PLC 12 is reprogrammed as a result of changes or reconfiguration of the controlled machine elements, the diagnostic module 10 need not be reprogrammed, but rather, it is merely necessary to edit, using the terminal 24, the data which has been entered into the diagnostic table as described immediately above.

Many machine and process control systems are configured such that a single PLC operates several machine or process stations. The diagnostic system of the present invention is well adapted to determine faults in a PLC controlling a number of stations using the "station start/stop definition function". A typical display on the CRT resulting from the selection of the station start/stop definition function is shown in FIG. 6. Each line of data corresponds to a station field on the far left side. The start data field includes the address in memory where the data is stored, as well as the state, and a description of the state. The "stop" fields contain similar information. The purpose of the station start/stop definition function is to allow the operator to define the type of action that indicates the start of a valid machine station cycle and the type of action which indicates the end of such cycle. This feature allows accurate fault reporting on the machines or processes at a number of stations where an operation may or may not be performed at a given station depending upon an independent condition. For example, in a machine transfer line consisting of a plurality of machine stations which successively operate on a part as it is transferred down the line, the diagnostic system of the present invention accurately reports faults even though the machine stations function independently of one another. The station start/stop definition function can also be employed to configure the diagnostic table to account for multiple models of parts being processed through the same machine station.

The "fault display" function permits the operator to display faults which have been diagnosed by the diagnostic module 10. Upon actuation of a special function key on the keyboard 28, the diagnostic module 10 displays each disparity or "fault" on the CRT 26. The order of displayed faults follows that of the entries into the diagnostic table. In the event a single command entry has more than one fault result entry, the command entry and each of the faulted results is listed for operator viewing.

The "timing display/editor" function permits the operator to time the events or operations of a PLC controlled machine.

The "communication menu" permits the operator to view and change memory stored data relating to communication between the diagnostic module 10 and the components or systems to which it is connected. For example, the baud rates, party, etc. may be selected and communication errors may be diagnosed.

Finally, the "run/stop" function merely allows the operator to start or stop operation of the diagnostic module 10.

As previously indicated, the diagnostic module 10 diagnoses operating faults by recording the number of times each command occurs and comparing that number to the number of times each operating result that should occur due to that command, actually does occur. If the number of times each result related to a particular command matches the number of times that the command was issued the machine or process being monitored is operating properly, however, the failure of such numbers to match indicates an operating fault.

The diagnosis of operating faults consists of three major steps:
(1) The creation of a list of data which is to be diagnosed, i.e., a diagnostic table,
(2) The collection of specified data from the PLC 12, and
(3) The diagnosis of the collected data, i.e., comparing the collected data with that of the diagnostic table.

The first step mentioned above, consisting of creating a list of data or diagnostic table, simply involves specifying the particular data which is to be gathered from the PLC 12 and how it is to be diagnosed. Which data is to be gathered involves specifying which "coils" and "contacts" are to be diagnosed. How the data is to be diagnosed involves specifying if it is necessary to diagnose whether the coils and contacts are to be turned on or off, and whether each coil and contact is a command which is to result in the change of an operating state or whether it is a result or change in operating state due to a command. This data is entered into the diagnostic module 10 by way of the terminal 24 as will be discussed below in more detail with reference to a specific example.

The step of collecting the data from the PLC 12 is best explained with reference to FIG. 3 which depicts a flowchart for a computer subroutine suitable for implementing this step of the method. After the diagnostic table or date list is created and stored in the diagnostic module 10, the program is started, the list is scanned and a request is initiated for PLC data on each coil and contact in the data list. The data returned from the PLC 12 is then analyzed to determine whether it has changed since the last time the data was requested. If no change is detected the next set of data is requested, however, if a change in state is noted such change is logged or recorded and the data list is further analyzed to determine whether the new state is a proper one. If the new state is correct, a counter is incremented, otherwise the counter is not incremented, and data is then requested from the PLC 12 for the next coil or contact. This sequence of steps is repeated until the entire list of coils and contacts has been scanned and the scanning process is continually repeated. At this point, it is inconsequential as to whether any collected data is "command" or "result" data; the purpose of the process is simply to gather the requested data and log changes of state represented by the data.

Diagnostic analysis of the collected data will now be explained with reference to FIG. 4 which depicts a flowchart for a suitable computer subroutine for implementing this step of the process. The diagnostic routine is started by examining each element of the list of data to determine whether it is a command. If the data element is not a command, data examination is continued. However, if the examined data element is determined to be a command, the value of its counter is noted and the following elements of the data list are then examined to determine whether any of them is a result corresponding to the examined command. If a result entry is found, the counts for the command and the corresponding result are compared. If these counts match, an operating fault does not exist and the next command or result element is then searched. If the counts do not match, an operating fault has occurred and both the command element and the mismatched result element are logged, following which the next command or result element is searched. The command/result groups that are logged in error as faults can be optionally displayed to an operator via the terminal 24 or may be stored in memory for statistical processing or other purposes.

Having described the method employed in the diagnostic system of the present invention, attention is now directed to FIG. 7 which depicts the details of one microcomputer system suitable for use in the diagnostic module 10. The microcomputer system broadly comprises a microprocessor 86 interconnected by an address bus 88, control bus 90 and a data bus 92 to a counter 101, a memory section 111 and an input/output section 113 which interfaces the microcomputer system with channels A-D. The microprocessor 86 may comprise, by way of example, a Zilog Z-80 driven by a clock 108 at a frequency of 3.6864 Mhz. Other microprocessors may also be employed, such as an Intel 8088 having an MS-DOS operating system.

Suitable buffers 94 may be employed as necessary to buffer up (amplify) the address and control signals output from microprocessor 86. Suitable select logic 96 controls the flow of data between the microprocessor 86 and the various sections of the input/output section 113. The input/output section 113 includes a miscellaneous control circuit 98, a serial input/output circuit 100, a parallel input/output circuit 102 and a non-volatile RAM (random access memory) 104.

The counter 101 is provided to count and store the number of "commands" and "results" (correct changes in operating states) resulting from the correlation processing performed by the microprocessor 86.

The memory section 111 includes a ROM 110 (read only memory) and a RAM 112 (random access memory) having a battery back-up 115 to prevent memory failure in the event of a loss of normal power. The ROM 110 stores the executive program for the computer as well as tables of static data storage. The RAM 112 is employed for scratchpad calculations and temporary data. Suitable select logic 114 is employed to select the portion of the memory section 111 into which data is to be written or from which data is read.

Circuits 98, 100 and 102 contain the conventional interface logic and level convertors to convert TTL signals to EIA-RS 232 levels. The miscellaneous control circuit 98 interfaces the microcomputer system with the reset switch 54 and indicator LEDs 46, 48, and includes a watch dog circuit which delivers a reset signal to a reset circuit 106 in the event the serial inputs to the control circuit 98 are not updated within a prescribed time interval. The reset circuit 106, which is also activated by the reset button 54, resets the microprocessor 86 as well as circuits 100, 102 and the non-volatile RAM 104.

The serial input/output circuit 100 may include a pair of Zilog Z80-SIO's which are serial input/output devices that allow for both synchronous and asynchronous communication.

The parallel input/output circuit 102 provides for two channels of TTL level parallel input/output, each channel being capable of transferring eight bits of data, with independent handshake signals. Each channels may be independently configured for a variety of operations including input, output, bi-directional and control.

The non-volatile RAM 104 allows for storage of data without battery back-up and is used for storage of operating parameters that can be field-modified by the operator, such as the baud rates for serial channels A-B.

It can be appreciated that the diagnostic method forming a portion of the system of the present invention can be implemented using various types and configurations of micro, mini and main frame computers.

From the foregoing it is apparent that the diagnostic system of the present invention not only provides for the reliable accomplishment of the objects of the invention but does so in a particularly reliable and efficient manner. It is recognized, of course, that those skilled in the art may make various modification or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

What is claimed is:

1. A method of diagnosing a fault in the operation of an apparatus having a plurality of operating elements which are normally actuated to different operating states as a result of commands issued from a programmed controller, wherein said commands are uniquely associated with a predefined valid set of changes in operating states of said operating elements, comprising the steps of:
   (A) successively sensing commands issued by said controller;
   (B) incrementing a first count each time a command is sensed in step (A), such that said first count is related to the number of times said command is issued by said controller;
   (C) successively sensing changes in the operating state of each of said operating elements;
   (D) incrementing a second count each time a change in operating state is sensed in step (c), such that said second count is related to the number of changes in operating states of said operating elements;
   (E) determining whether said first and second counts are in a predefined valid relationship to each other; and
   (F) declaring a fault if said first and second counts are not in said predefined valid relationship to each other based on the determination made in step (E).

2. The method of claim 1, including the steps of:
   (G) storing said predefined valid relationships as data in a memory; and
   (H) storing said first and second counts as data in a memory, and wherein said step (E) is performed by retrieving from said memory the data stored in steps (G) and (H).

3. The method of claim 1, including the step of:
   (I) storing as data in memory each said fault declaration and each said command and result which gave rise to each said fault declaration.

4. The method of claim 1, wherein said method of diagnosing is performed on a digital processor separate from said programmed controller.

5. A method of diagnosing a fault in the operation of a plurality of machine elements each having multiple operating states which can be automatically changed by commands issued by a programmed controller, comprising the steps of:
   (A) successively sensing commands issued by said controller;
   (B) incrementing a first count each time a command is sensed in step (A), such that said first count is related to the number of times said command is issued by said controller;
   (C) storing said first count as data in a memory;
   (D) successively sensing changes in the operating state of each of said machine elements;
   (E) incrementing a second count each time a change is sensed in said operating state of each of said machine elements, such that said second count represents the number of sensed changes in operating states of each of said machine elements;

(F) storing said second count as data in a memory;
(G) determining whether said stored first and second counts are in a predefined valid relationship to each other; and
(H) declaring a fault if said stored first and second counts are not in said predefined valid relationship to each other based upon the determination made in step (G).

6. The method of claim 5, wherein said method is performed by a digital processor separate from said programmed controller.

7. The method of claim 5 wherein step (G) is performed by programming a computer to associate one or more of the counts in said first count with a predefined number of counts in said second count.

8. The method of claim 7 wherein the programming step is performed on a digital processor separate from said programmed controller.

9. The method of claim 7, wherein the programming step is further performed by entering into a memory the valid state of each machine element for each of said commands.

10. The method of claim 9, wherein the programming step is further performed by editing said valid state of each machine element.

* * * * *